US012609884B2

(12) United States Patent
Zheng

(10) Patent No.: US 12,609,884 B2
(45) Date of Patent: Apr. 21, 2026

(54) METHOD AND APPARATUS FOR SENDING ROUTE CALCULATION INFORMATION, DEVICE, AND STORAGE MEDIUM

(71) Applicant: HUAWEI TECHNOLOGIES CO., LTD., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 18/306,350

(22) Filed: Apr. 25, 2023

(65) Prior Publication Data

US 2023/0269164 A1 Aug. 24, 2023

Related U.S. Application Data

(63) Continuation of application No. PCT/CN2021/122688, filed on Oct. 8, 2021.

(30) Foreign Application Priority Data

Oct. 26, 2020 (CN) .......................... 202011158233.6

(51) Int. Cl.
*H04L 45/02* (2022.01)
*H04L 45/12* (2022.01)

(52) U.S. Cl.
CPC .............. *H04L 45/02* (2013.01); *H04L 45/12* (2013.01)

(58) Field of Classification Search
None
See application file for complete search history.

(56) References Cited

U.S. PATENT DOCUMENTS

| | | | |
|---|---|---|---|
| 2001/0032272 A1* | 10/2001 | Fujita ...................... | H04L 45/12 709/241 |
| 2007/0217346 A1* | 9/2007 | Zheng ................... | H04W 40/24 370/408 |
| 2011/0161489 A1* | 6/2011 | Bhatt .................. | H04L 43/0811 709/224 |
| 2011/0258341 A1* | 10/2011 | Suzuki .................. | H04L 45/025 709/241 |

(Continued)

FOREIGN PATENT DOCUMENTS

CN 111510383 A 8/2020

OTHER PUBLICATIONS

European Search Report for Application No. EP 21884898 dated Mar. 20, 2024, 9 pages.

*Primary Examiner* — Schquita D Goodwin
*Assistant Examiner* — Ishrat Rashid

(57) ABSTRACT

The technology of this application relates to a method and apparatus for sending route calculation information, a device, and a storage medium. The method relates to the field of communications technologies. The method includes receiving route calculation information, where the route calculation information includes computing capability information of a computing container, and the computing capability information indicates a computing capability corresponding to the computing container. The method further includes obtaining a shortest path tree, where the shortest path tree includes a shortest path from a router to each other router in a routing domain, and sending the route calculation information to each other router in a network based on the shortest path tree.

20 Claims, 9 Drawing Sheets

(56)                    References Cited

U.S. PATENT DOCUMENTS

2012/0071174  A1 *    3/2012   Bao ....................... H04W 48/16
                                                            455/456.3
2013/0322262  A1 *   12/2013   Akman ................. H04W 24/10
                                                            370/242
2015/0131658  A1 *    5/2015   Wijnands ............ H04L 45/7453
                                                            370/392

* cited by examiner

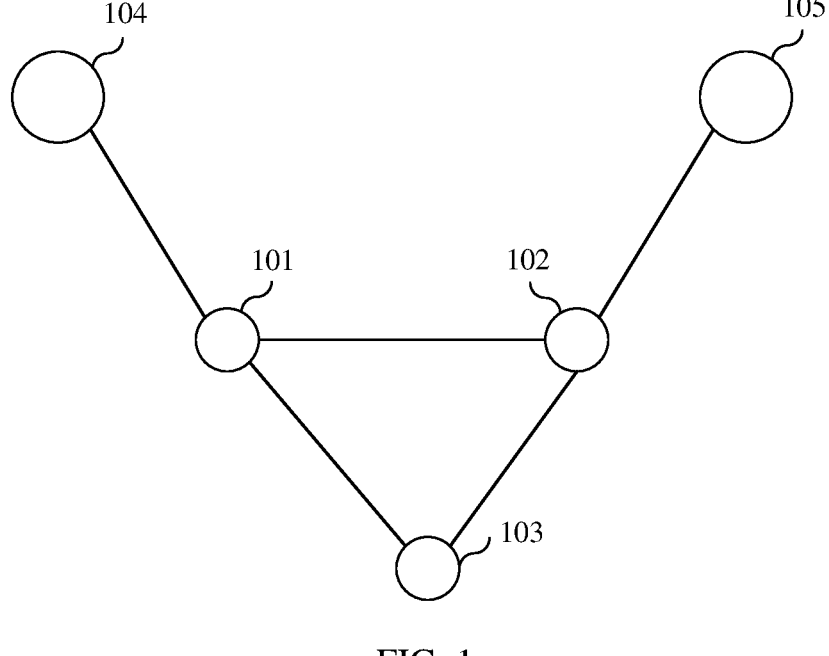

FIG. 1

| 201 |
| --- |
| Obtain route calculation information, where the route calculation information includes service capability information or computing capability information of a computing container, the computing capability information indicates a computing capability corresponding to the computing container, and the service capability information indicates a service processing capability of the computing container |

| 202 |
| --- |
| Obtain a shortest path tree, where the shortest path tree includes a shortest path from a router to each other router in a network |

| 203 |
| --- |
| Send the route calculation information to each other router in the network based on the shortest path tree |

Obtain route calculation information

302

Obtain a shortest path tree

303

When a hotspot attribute value is greater than a hotspot threshold, send the route calculation information to each other router in a network based on the shortest path tree

304

Generate or update a RIB or FIB table corresponding to a router based on the route calculation information Basic routing layer

Hot service

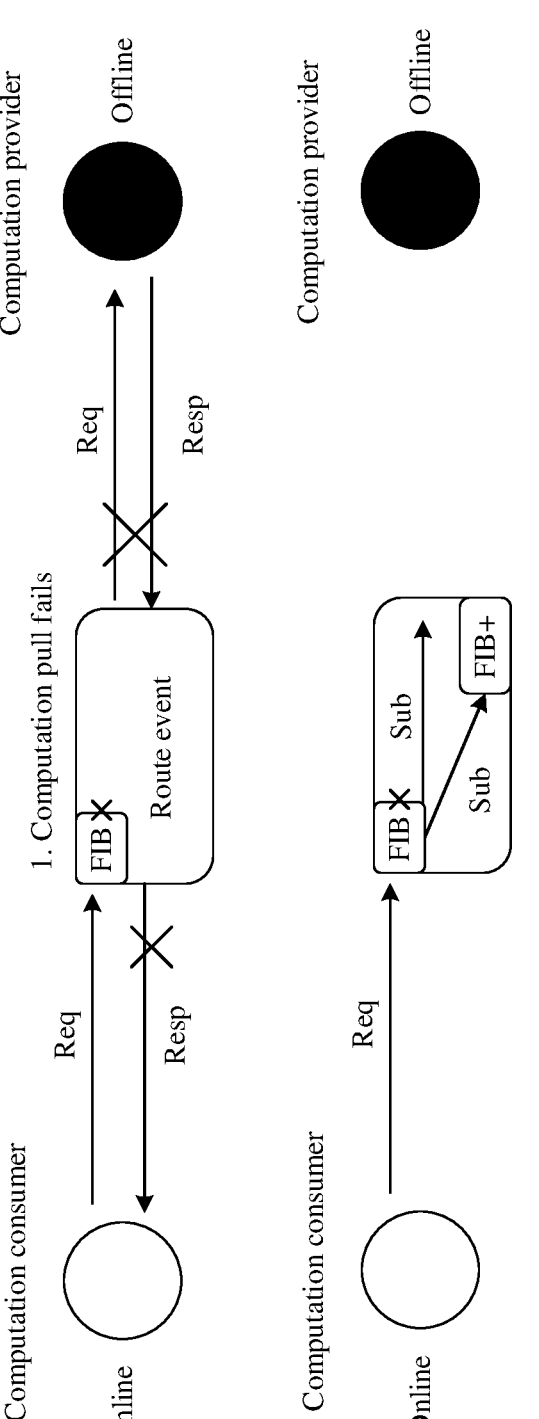
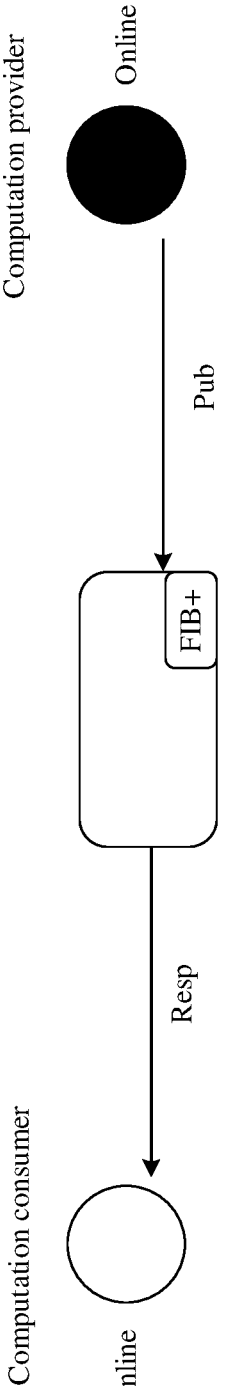
FIG. 9

1

METHOD AND APPARATUS FOR SENDING ROUTE CALCULATION INFORMATION, DEVICE, AND STORAGE MEDIUM

CROSS-REFERENCE TO RELATED APPLICATIONS

This application is a continuation of International Application No. PCT/CN2021/122688, filed on Oct. 8, 2021, which claims priority to Chinese Patent Application No. 202011158233.6, filed on Oct. 26, 2020. The disclosures of the aforementioned applications are hereby incorporated by reference in their entireties.

TECHNICAL FIELD

This application relates to the communications field, and in particular, to a method and apparatus for sending route calculation information, a device, and a storage medium.

BACKGROUND

Currently, there are two development trends of Internet computing. One is a trend that features a ubiquitous computing capability. To be specific, computing containers of different scales of computing capabilities are widely distributed at locations with different distances from users. The other is a trend that features being microservice-based or serverless.

In a related technology, a conventional user-server mode is deconstructed. An application on a server side forms a "functional component" and is deployed on a cloud platform, and is uniformly scheduled by an application programming interface (API) gateway, so that a time-triggered function component can be dynamically instantiated on demand. Service logic on a server can be transferred to a client side by using a container technology. The client side only needs to focus on a "computing function", and does not need to sense a computing location and computing resources such as the server, a virtual machine, and a container.

However, in the related technology, when a computing capability corresponding to a computing container is published to a network for route calculation, route calculation information of the computing container usually needs to be flooded to all routers in a routing domain. When there are a large quantity of services or functions, a large amount of route information is correspondingly generated. As a result, network congestion may occur due to a sharp traffic increase.

SUMMARY

Embodiments of this application provide a method and apparatus for sending route calculation information, a device, and a storage medium, to improve efficiency of data exchange between compute node devices. The technical solution is as follows.

In one aspect, a method for sending route calculation information is provided, where the method is executed by a router, and the method includes:

receiving route calculation information, where the route calculation information includes service capability information or computing capability information of a computing container, the computing capability information indicates a computing capability corresponding to the computing container, and the service capability information indicates a service processing capability of the computing container;

obtaining a shortest path tree, where the shortest path tree includes a shortest path from the router to each other router in a network; and sending the route calculation information to each other router in the network based on the shortest path tree.

In a possible implementation, the route calculation information further includes a service or function identifier.

In a possible implementation, the route calculation information further includes a hotspot attribute value, and the hotspot attribute value indicates whether a service or an application corresponding to the route calculation information is a hotspot service.

The sending the route calculation information to each other router in the network based on the shortest path tree includes:

when the hotspot attribute value is greater than a hotspot threshold, sending the route calculation information to each other router in the network based on the shortest path tree.

In a possible implementation, the method further includes:

generating or updating a route information base (RIB) routing table or a forwarding information base (FIB) forwarding table corresponding to the router based on the route calculation information.

In a possible implementation, the generating or updating a RIB routing table or a FIB forwarding table corresponding to the router based on the route calculation information includes:

obtaining network capability information of the network; and performing route calculation on the network based on the route calculation information and the network capability information, and generating or updating the RIB or FIB table corresponding to the router.

In a possible implementation, the method further includes:

receiving a calculation request message, where the calculation request message is used to obtain a calculation program or a calculation result, and the calculation request message includes a service or function identifier;

querying a RIB or FIB table of the router based on the service or function identifier;

when the service or function identifier exists in the RIB or FIB table of the router, obtaining, based on the RIB or FIB table of the router, a first-type egress port or a first-type next-hop address corresponding to the service or function identifier; and sending the calculation request message based on the first-type egress port or the first-type next-hop address corresponding to the service or function identifier.

In a possible implementation, the method further includes:

receiving a response message, where the response message is used to deliver the calculation program or the calculation result;

determining, based on address information included in the response message, a first-type egress port or a first-type next-hop address corresponding to the response message; and sending the response message based on the first-type egress port or the first-type next-hop address corresponding to the response message.

In a possible implementation, the method further includes:

obtaining a subscription message, where the subscription message is used to obtain a calculation program or a calculation result;

obtaining a second-type egress port or a second-type next-hop address corresponding to the shortest path tree; and sending the subscription message to each other router in the network based on the second-type egress port or the second-type next-hop address corresponding to the shortest path tree.

In a possible implementation, the obtaining a subscription message includes:

receiving a calculation request message, where the calculation request message is used to obtain the calculation program or the calculation result; and obtaining the calculation request message as the subscription message.

In a possible implementation, the obtaining a shortest path tree includes:

performing network topology discovery on the network to obtain the shortest path tree.

In a possible implementation, the subscription message includes a service or function identifier, and the method further includes:

writing the service or function identifier and input port information corresponding to the subscription message into a RIB or FIB forwarding table of the router.

In a possible implementation, the receiving route calculation information includes:

receiving a protocol packet of the computing container, where the protocol packet is delivered to the router after the computing container runs a routing protocol; and obtaining the route calculation information of the computing container based on the protocol packet.

According to another aspect, an apparatus for sending route calculation information is provided, where the apparatus is used in a router, the apparatus includes a data plane unit and a control plane unit, and the control plane unit includes a basic routing layer module and a function routing layer module.

The function routing layer module is configured to receive route calculation information, where the route calculation information includes service capability information or computing capability information of a computing container, the computing capability information indicates a computing capability corresponding to the computing container, and the service capability information indicates a service processing capability of the computing container.

The basic routing layer module is configured to obtain a shortest path tree, where the shortest path tree includes a shortest path from the router to each other router in a network.

The function routing layer module is configured to send the route calculation information to each other router in the network based on the shortest path tree.

According to still another aspect, a routing device is provided, where the routing device includes a processor, a memory, and a transceiver.

The transceiver is configured to receive route calculation information, where the route calculation information includes service capability information or computing capability information of a computing container, the computing capability information indicates a computing capability corresponding to the computing container, and the service capability information indicates a service processing capability of the computing container.

The processor is configured to obtain a shortest path tree, where the shortest path tree includes a shortest path from a router to each other router in a network.

The transceiver is configured to send the route calculation information to each other router in the network based on the shortest path tree.

According to still another aspect, a computer device is provided. The computer device includes a processor and a memory, the memory stores at least one instruction, at least one program, a code set or an instruction set, and the at least one instruction, the at least one program, the code set or the instruction set is loaded and executed by the processor to implement the foregoing method for sending route calculation information.

According to yet another aspect, a computer-readable storage medium is provided. The storage medium stores at least one instruction, at least one program, a code set or an instruction set, and the at least one instruction, the at least one program, the code set or the instruction set is loaded and executed by a processor to implement the foregoing method for sending route calculation information.

According to yet another aspect, a computer program product or a computer program is provided. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the foregoing method for sending route calculation information.

The technical solutions provided in this application may include the following beneficial effects: When receiving route calculation information indicating a computing capability of a computing container, a router obtains a shortest path tree of another router in a routing domain corresponding to the router, and sends, based on the shortest path tree corresponding to the router, the route calculation information to each other router in a network corresponding to the router, so that each router performs route calculation based on the route calculation information. According to the foregoing solution, the router performs route calculation based on the route calculation information distributed based on the shortest path tree. The computing capability of the computing container is considered during routing path selection, and traffic consumed for sending the route calculation information is reduced.

It should be understood that the foregoing general description and the following detailed description are only examples and explanatory, and do not limit this application.

BRIEF DESCRIPTION OF DRAWINGS

The accompanying drawings herein are incorporated into the specification and constitute a part of the specification, show embodiments conforming to this application, and are used together with the specification to explain a principle of this application.

FIG. 1 is an example schematic diagram of a network including a computing container according to an example embodiment;

FIG. 2 is an example schematic flowchart of a method for sending route calculation information according to an example embodiment;

FIG. 9 is an example schematic flowchart of a routing method according to the embodiment shown in FIG. 3;

DESCRIPTION OF EMBODIMENTS

Figure 3:
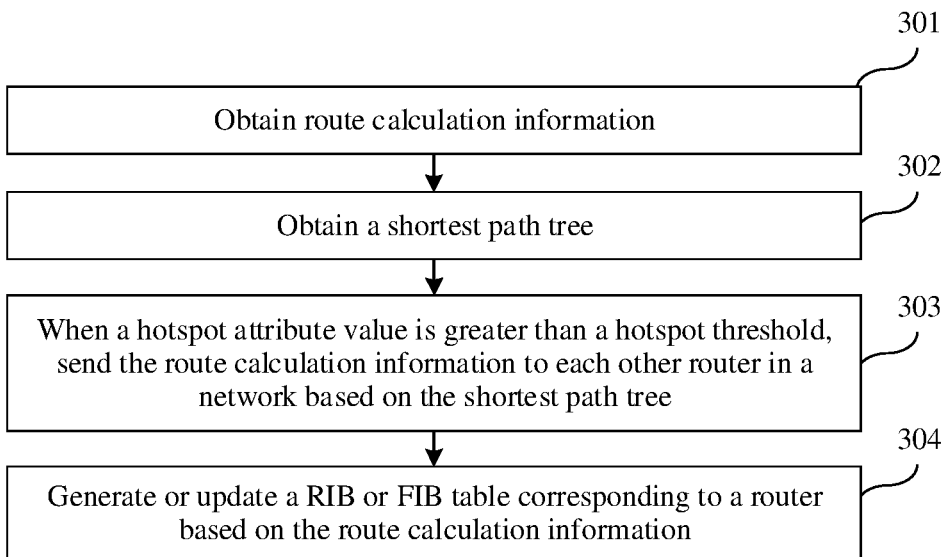
FIG. 3 is an example method flowchart of a method for sending route calculation information according to an example embodiment.

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with this application. On the contrary, the implementations are only examples of apparatuses and methods that are described in the appended claims in detail and that are consistent with some aspects of this application.

Before embodiments shown in this application are described, several concepts in this application are first described.

(1) Container Technology

The container technology effectively divides resources of a single operating system into isolated groups to better balance conflicting resource usage requirements between the isolated groups. A container is a lightweight, operating system-level virtualization technology that allows an application and its dependency to run during resource isolation. All necessary components required for running the application are packaged into a single image, which can be reused. When the image runs, the image runs in an independent environment, and does not share a memory, a central processing unit (CPU), or a disk of a host operating system with another application. This ensures that a process in the container does not affect any process outside the container.

(2) Router

The router is a hardware device that connects two or more networks, functions as a gateway between the networks, and is a dedicated intelligent network device that reads an address in each data packet and determines how to transmit the data packet. The router can understand different protocols such as an Ethernet protocol used by a local area network and the transmission control protocol/Internet protocol (TCP/IP) used by the Internet. In this way, the router may analyze destination addresses of data packets transmitted from different types of networks; convert addresses of non-TCP/IP networks into TCP/IP addresses, or convert TCP/IP addresses into addresses of non-TCP/IP networks; and then transmit the data packets to a specified location based on a selected routing algorithm. In an open standards interconnection-reference model (open system interconnect reference model, OSI/RM), the router perform network layer relay and layer-3 relay tasks, store and forward data packets between different networks, and mainly separate networks in different logic. Data is transmitted from one subnet to another subnet, and can be processed by a routing function of the router. In network communication, the router can determine a network address and select an IP path. A flexible link system can be constructed in a plurality of network environments to link subnets by using different data packets and media access modes. The router receives only information transmitted by an origin server or another related router, and is an interconnection device based on a network layer. Alternatively, the router in this application may be replaced with a switch.

(3) Routing Domain

The routing domain usually refers to an autonomous system. On the Internet, the autonomous system is a small unit that has a right to independently determine which routing protocol should be used in the system. The network unit may be a simple network or may be a network group controlled by one or more ordinary network administrators, and is an individual and manageable network unit (for example, a university, an enterprise, or an individual company).

(4) Network Topology (NT)

The network topology refers to a physical layout of various devices connected by using a transmission medium. The network topology specifies physical (real) or logical (virtual) arrangement of network members. If connection structures of two networks are the same, it may be referred to that network topologies of the two networks are the same, although distances between nodes and physical connections of the two networks may be different.

In an edge computing scenario, computing power of a single edge computing station is limited, and computing power reliability of the single edge computing station is lower than computing power reliability of a data center. Generally, a plurality of copies of a service need to be provided across a plurality of edge stations to ensure better performance and accuracy. FIG. 1 is a schematic diagram of a network including a computing container according to an example embodiment. The network may be a routing domain, and the routing domain may include a computing container and a router. A quantity of computing containers and a quantity of routers are not limited herein. Each node in FIG. 1 may be a router or a network routing node, and an edge is a link between adjacent nodes. A weighted value may also be referred to as a link state. The link between the adjacent nodes may be a directly connected physical link, or may be a logical link reachable through a network. The computing container and the router may be connected through a virtual link. As shown in FIG. 1, a router 101, a router 102, and a router 103 are included. A computing container (compute node) 104 corresponding to a function X and a computing container (compute node) 105 corresponding to a function Y are added to a routing domain as leaf routers, so that a computing capability of the computing container can be injected into a network by using a routing protocol. For example, the computing capability of the computing container is injected into an adjacent ingress router in a routing domain topology structure by using an interior gateway protocol (IGP) or a border gateway protocol (BGP), and then the ingress router floods the computing capability of the computing container as route calculation information to each router in the routing domain. In this way, each router in the routing domain obtains information about the computing container that has the computing capability in the routing domain. Finally, the router calculates a proper route based on the computing capability, and forwards a client service request and terminal data to a plurality of edge stations or computing containers, thereby implementing load balancing.

It may be understood that the computing container in this embodiment of this application may be a server, a virtual machine, a container, or a small unit that provides a computing resource. Alternatively, the computing container may be a user terminal, and the user terminal may be a mobile phone, a tablet computer, an e-book reader, smart glasses, a smart watch, a smart television, or an moving picture experts group audio layer III (MP3) player. Alternatively, the computing container may be a computing server, and the computing server may be a server, may include several servers, may be a virtualization platform, may be a cloud computing service center, or the like. The foregoing router may be a wired router, a wireless router, or a switch having a routing function.

The foregoing router performs data transmission by using a communications network. Optionally, the communications network is a wired network or a wireless network.

Optionally, the wireless network or the wired network uses a standard communications technology and/or a standard communications protocol. A network is usually the Internet, but may also be any network, including but not limited to any combination of a local area network (LAN), a metropolitan area network (MAN), a wide area network (WAN), a mobile network, a wired network, a wireless network, a private network, or a virtual private network. In some embodiments, techniques and/or formats including hypertext markup language (HTML), extensible markup language (XML), and the like are used to represent data exchanged through a network. In addition, all or some links may be encrypted by using conventional encryption technologies such as a secure socket layer (SSL), transport layer security (TLS), a virtual private network (VPN), and Internet protocol security (IPsec). In other embodiments, a customized and/or dedicated data communications technology may be used to replace or supplement the foregoing data communications technology. This is not limited in this application.

FIG. 2 is a schematic flowchart of a method for sending route calculation information according to an example embodiment. The method is applied to the network including the computing container in the embodiment shown in FIG. 1. The method is performed by a router, and the router is an ingress router that corresponds to the computing container and that is in the network including the computing container. As shown in FIG. 2, a procedure of the method for sending route calculation information may include the following steps.

Step 201: Obtain route calculation information, where the route calculation information includes service capability information or computing capability information of the computing container, the computing capability information indicates a computing capability corresponding to the computing container, and the service capability information indicates a service processing capability of the computing container.

In a possible implementation, the computing container is a computing container connected to the router through a virtual link, and the computing container sends the route calculation information that includes the computing capability information to the router through the virtual link.

Step 202: Obtain a shortest path tree, where the shortest path tree includes a shortest path from the router to each other router in the network.

In a possible implementation, the shortest path tree may be obtained based on a shortest path first (SPF) algorithm in an IGP type routing protocol, and based on the shortest path tree, the shortest path from the router to each other router in the network may be obtained.

In a possible implementation, the shortest path tree further includes a shortest path from the router to each computing container in the network.

Step 203: Send the route calculation information to each other router in the network based on the shortest path tree.

Each other router is a target router corresponding to each shortest path in the shortest path tree.

In a possible implementation, when the router is an adjacent router connected to the computing container through the virtual link, the computing container is sent to each other router in the network based on the shortest path tree.

In a possible implementation, the computing container included in the network may be used as a leaf router in the network. In other words, the route calculation information may be sent, based on the shortest path tree, to another computing container other than the computing container corresponding to the route calculation information.

In conclusion, in the solution shown in this embodiment of this application, when receiving the route calculation information indicating the computing capability of the computing container, the router obtains a shortest path tree of another router in a routing domain corresponding to the router, and sends, based on the shortest path tree corresponding to the router, the route calculation information to each other router in the network corresponding to the router, so that each router performs route calculation based on the route calculation information. According to the foregoing solution, the router performs route calculation based on the route calculation information distributed based on the shortest path tree. The computing capability of the computing container is considered during routing path selection, and traffic consumed for sending the route calculation information is reduced.

FIG. 3 is a method flowchart of a method for sending route calculation information according to an example embodiment. The method is applied to the network including the compute node in the embodiment shown in FIG. 1, and the method is executed by a router. The router is any router in the network including the compute node. As shown in FIG. 3, a procedure of the method for sending route calculation information may include the following steps.

Step 301: Obtain route calculation information.

The route calculation information further includes a hotspot attribute value, and the hotspot attribute value is used to determine whether a service or an application corresponding to the route calculation information is a hotspot service.

In a possible implementation, the route calculation information further includes a service or function identifier.

The service or function identifier indicates a service or function type corresponding to the route calculation information.

In a possible implementation, a protocol packet of the computing container is received by using a function routing layer. The protocol packet is delivered to the router after the computing container runs a routing protocol, and the route calculation information of the computing container is obtained based on the protocol packet by using the function routing layer.

The protocol packet of the computing container may be a packet corresponding to an/a IGP or BGP. After running the IGP or BGP protocol, the computing container sends the protocol packet to the router, where the packet includes the route calculation information of the computing container.

Step 302: Obtain a shortest path tree.

In a possible implementation, network topology discovery is performed on the network to obtain the shortest path tree.

Step 303: When the hotspot attribute value is greater than a hotspot threshold, send the route calculation information to each other router in the network based on the shortest path tree.

In a possible implementation, a next-hop device is a next-hop device that is in the shortest path tree and that is in a routing path to each other router in the network. When the hotspot attribute value is greater than the hotspot threshold, the router receives route calculation information sent by a previous-hop device, and sends, based on the shortest path tree, the route calculation information to the next-hop device in each routing path corresponding to the shortest path tree.

In a possible implementation, a next-hop device may be a router device, or the next-hop device may be the computing container.

To be specific, when the hotspot attribute value is greater than the hotspot threshold, a type of service, application, or function corresponding to the route calculation information is a hotspot service. In this case, the route calculation information corresponding to the computing container may be actively sent to each router in the network based on the shortest path tree.

In a possible implementation, the route calculation information corresponding to the computing container may be sent to each computing container in the network based on the shortest path tree.

In a possible implementation, the route calculation information is written into a routing information base (RIB) routing table or a forwarding information base (FIB) forwarding table of the router.

In a possible implementation, route calculation information of a plurality of computing containers in the network is written into the RIB or FIB table of the router.

Step 304: Generate or update the RIB or FIB table corresponding to the router based on the route calculation information.

In a possible implementation, route calculation is performed based on the route calculation information, and the RIB or FIB table corresponding to the router.

In a possible implementation, route calculation is performed based on the route calculation information, and the RIB routing table or the FIB forwarding table corresponding to the router is generated or updated.

The routing table indicates routing path selection when the router performs data transmission. The route calculation information includes computing capability information indicating a computing capability of the computing container, or includes service capability information indicating a service capability of the computing container. Route calculation is performed based on the computing capability information or the service capability information, and a parameter of the computing container may be considered during route calculation. Therefore, a calculated routing path can be used to more efficiently perform data transmission corresponding to the computing container.

In a possible implementation, route calculation is performed based on the route calculation information, the RIB routing table corresponding to the router may be generated, and the FIB forwarding table is updated based on the RIB routing table.

In a possible implementation, network capability information of the network is obtained, route calculation is performed on the network based on the route calculation information and the network capability information, and the RIB or FIB table corresponding to the router is updated.

In a possible implementation, the network capability information includes a network metric value or a network parameter, and the network parameter includes at least one of network bandwidth and a network delay.

The route calculation information includes the computing capability information indicating the computing capability of the computing container, and the network capability information indicates a network status of the network. When route calculation is performed on the network based on the route calculation information and the network capability information, both a computing capability of each computing container and the network status of the network may be considered. In this way, load balancing can be implemented while the router runs normally.

When the hotspot attribute value is greater than the hotspot threshold, that is, when a service or function corresponding to the computing container is the hotspot service, the route calculation information corresponding to the computing container is sent to each router in the network based on the shortest path tree. In addition, each network writes the route calculation information corresponding to the computing container into the FIB table, and performs route calculation based on the route calculation information.

In a possible implementation, the function routing layer in the router performs route calculation based on the route calculation information, and updates the FIB table corresponding to the router.

In a possible implementation, the router receives a computation request message. The computation request message is used to obtain a calculation program or a calculation result, and the computation request message includes a service or function identifier. The router queries the RIB or FIB table of the router based on the service or function identifier; when the service or function identifier exists in the RIB or FIB table of the router, obtains, based on the FIB table of the router, a first-type egress port or a first-type next-hop address corresponding to the service or function identifier; and sends the request packet based on the first-type egress port or the first-type next-hop address corresponding to the service or function identifier.

The first-type egress port and the first-type next-hop address may be a Req-resp (that is, a request message and a response message) egress port and a Req-resp next-hop address.

When the router queries the RIB or FIB table of the router based on the service or function identifier, and the service and the function identifier exist in the RIB or FIB table of the router, it indicates that the route calculation information including the service and the function identifier is delivered to each router based on the shortest path tree. In other words, the service and the function identifier correspond to the hotspot service. After the route calculation information corresponding to the computing container is input into the RIB or FIB table of the router, and the router performs route calculation based on the route calculation information, and updates the RIB or FIB table. In this case, when receiving a packet and the packet is the computation request message corresponding to the service or function identifier of the route calculation information, the router directly sends the request packet based on the Req-resp egress port or the Req-resp next-hop address corresponding to the service or function identifier in the updated RIB or FIB table.

In a possible implementation, the router receives the computation request message by using a data plane of the router.

In a possible implementation, the request packet is a computation request message sent by a computation/function consumer.

In a possible implementation, the router receives a response message, where the response message is used to deliver the calculation program or the calculation result; determines, based on address information included in the response message, a first-type egress port or a first-type next-hop address corresponding to the response message; and sends the response message based on the first-type egress port or the first-type next-hop address corresponding to the response message.

The response message may be a packet message sent by a computation/function provider, that is, a packet message sent after the computing container in this embodiment of this application receives the request message. When receiving the response message, the router directly forwards the response packet based on the address information corresponding to the response message.

In a possible implementation, when the computation request message includes an Internet protocol (IP) address corresponding to the computation/function consumer, or includes an IP address corresponding to an adjacent router connected to the computation/function consumer through a virtual link, the router directly forwards the response message based on the IP address and by using an IP route.

In a possible implementation, the response packet may be received by using the data plane of the router.

In a possible implementation, when the hotspot attribute value is not greater than the hotspot threshold, the route calculation information is discarded.

To be specific, when the hotspot attribute value is not greater than the hotspot threshold, that is, when the computing container determines, by using the adjacent router connected to the virtual link, that a service or function corresponding to the service or function identifier is a non-hotspot service, the adjacent router discards the service or function identifier, the hotspot attribute value, and the computing capability information that are corresponding to the route calculation information. In other words, when the hotspot attribute value is not greater than the hotspot threshold, the adjacent router discards the route calculation information, and does not actively send the route calculation information to each router.

In a possible implementation, the router obtains a subscription message, where the subscription message is used to obtain a calculation program or a calculation result; obtains a second-type egress port or a second-type next-hop address corresponding to the shortest path tree; and sends the subscription message to each other router in the network based on the second-type egress port or the second-type next-hop address corresponding to the shortest path tree.

The subscription message includes a service or function identifier, and the second-type egress port or the second-type next-hop address may be a Pub-sub (a publish message and a subscription message) egress port and a Pub-sub next-hop address.

To be specific, the router may further accept the subscription message (that is, the subscription message). When receiving the subscription message, the router directly sends the subscription message to all routers in the network based on the shortest path tree.

In a possible implementation, the service or function identifier and (Pub-sub) second-type ingress port information corresponding to the subscription message are written into the RIB or FIB table of the router.

In a possible implementation, the service or function identifier and input port information corresponding to the subscription message are written into a service or function ID (identity document, identity document) and Pub-sub egress port information in the RIB or FIB table of the router.

In a possible implementation, a publish message is received. The publish message is used to send the calculation program or the calculation result, and the publish message includes a service or function identifier of a subscription message corresponding to the publish message. The RIB or FIB table of the router is queried based on the service or function identifier, and an input port corresponding to the subscription message is obtained as a second-type egress port or a second-type next-hop address corresponding to the subscription message. The publish message is sent based on the second-type egress port or the second-type next-hop address corresponding to the subscription message.

In a possible implementation, the calculation program or the calculation result of the computing container corresponding to the service or function identifier is delivered based on the computing container and by using the publish message.

In a possible implementation, a computation request message is received. The computation request message is used to obtain the calculation program or the calculation result, the request packet is sent to the function routing layer of the router by using a data plane, and the computation request message is obtained as the subscription message.

In a possible implementation, when receiving the request packet from the data plane, the router finds that the service or function identifier does not exist in the RIB or FIB table of the router, the data plane of the router sends the request message to the function routing layer of the router, and the function routing layer converts the request message into the subscription message.

Figure 4:
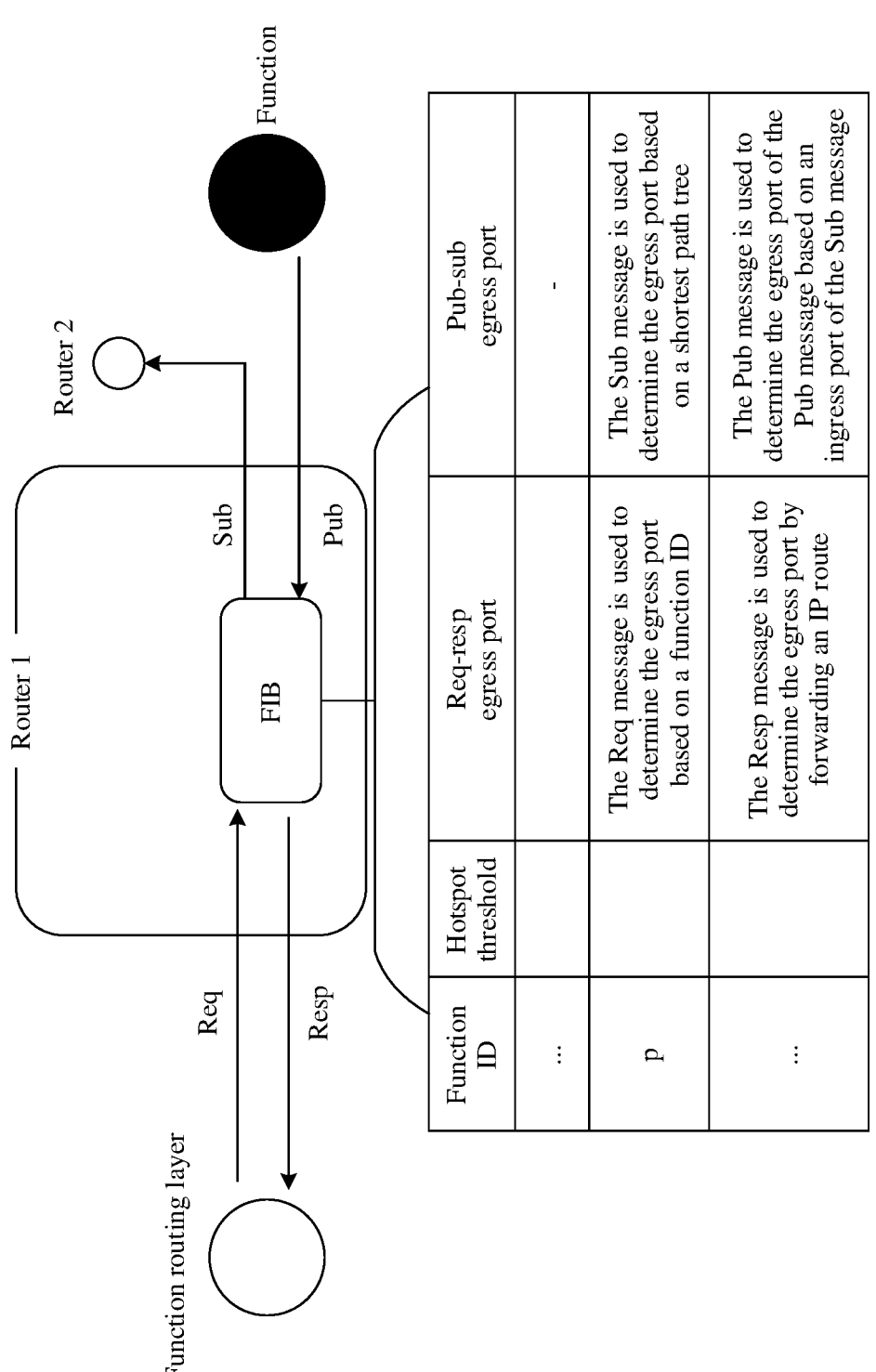
FIG. 4 is an example diagram of setting a router and a FIB entry according to the embodiment shown in FIG. 3.

FIG. 4 is a diagram of setting a router and a FIB entry according to an embodiment of this application. First, it is necessary to define four communications primitives designed for the router.

A request message is used for a service, function, or computation request, and is initiated by a service, function, or computation consumer.

A response message is used to respond to a service, function, or computation request, usually responds to a request message, and is initiated by a service, function, or computation provider.

The subscription message is used to subscribe to a service, function, or computation request, and is initiated by the router.

A publish message is used to respond to a service, function, or computation request, usually responds to a subscription message, and is initiated by a service, function, or computation provider.

All the four types of messages may carry a "service or function identifier".

As shown in FIG. 4, the router in this embodiment of this application includes two units: a control plane unit and a data plane unit.

The data plane is configured to receive a packet. If the packet is a data packet, namely, the request message, a Req-resp egress port or a Req-resp next-hop address is obtained by querying the FIB based on the service or function identifier carried in the packet. The Req-resp egress port forwards the packet, or forwards the packet to a device at which the Req-resp next-hop address is located. If a corresponding item is not found in the FIB based on the service or function identifier carried in the packet, the packet is sent to the control plane.

When the packet is the response message, the packet is forwarded by using a common IP route.

When the packet is the subscription message, the packet is sent to the control plane.

When the packet is the publish message, a Pub-sub egress port is obtained by querying the FIB based on the service or function identifier carried in the packet, and the Pub-sub egress port forwards the packet.

The data plane is further configured to: receive a BGP/IGP packet, and when receiving the BGP/IGP packet, deliver the BGP/IGP packet to the control plane.

The control plane includes two routing layers: a basic routing layer and a function routing layer.

The basic routing layer is configured to: discover a network topology, and calculate a shortest path tree from the local router to another router.

The function routing layer is configured to: receive the BGP/IGP packet, select or calculate a route based on computing capability information that corresponds to the service or function identifier in the BGP/IGP packet and that is of a computing container, and write, into the FIB, an ingress port receiving the packet or a router address carried in the BGP/IGP packet, for example, write the corresponding Req-resp egress port or Req-resp next-hop address into the FIB.

The function routing layer may be further configured to: receive the BGP/IGP packet from the computing container, and publish route calculation information based on the computing capability information that corresponds to the service or function identifier in the packet and that is of the computing container. The route calculation information includes the service or function identifier, the computing capability information that corresponds to the service or function identifier and that is of the computing container, and an ID of a router to which the route information belongs. The route calculation information may further include a hotspot attribute value. The function routing layer does not perform network-wide flooding (flooding method) on the route calculation information, but sends the route calculation information to another router based on the shortest path tree obtained by the basic routing layer. The function routing layer may further determine, based on the hotspot attribute value and a hotspot threshold in the route calculation information, whether to send the route calculation information to the another router based on the shortest path tree obtained by the basic routing layer. In other words, only a hot service actively publishes the calculated routing information to the network, which reduces the traffic and the scale of the FIB forwarding table.

The function routing layer is further configured to: for a packet from the data plane, if the packet is a subscription message, write, based on a service or function identifier carried in the subscription message and an ingress port that is of the data plane corresponding to the subscription message and that receives the packet, the service or function ID and corresponding ingress port information of the service or function ID into a service or function ID and the Pub-sub egress port of the FIB forwarding table.

The function routing layer is further configured to: receive a packet of the data plane, and if the packet is a request message, convert the request message into a subscription message.

The function routing layer is further configured to receive a subscription message generated by the function routing layer, that is, a subscription message converted from a request message. When receiving the subscription message generated by the function routing layer, the function routing layer receives, based on the data plane corresponding to the subscription message (that is, the data plane corresponding to the request message before conversion), an ingress port of the packet and a service or function identifier carried in the subscription message, and writes the service or function ID and corresponding ingress port information of the service or function ID into a service or function ID and the Pub-sub egress port of the FIB forwarding table.

The function routing layer module is further configured to: receive a packet generated by the function routing layer module or a packet from the data plane, and if the packet is a subscription message, distribute the subscription message to another router based on the shortest path tree obtained by the basic routing layer module.

Figure 5:
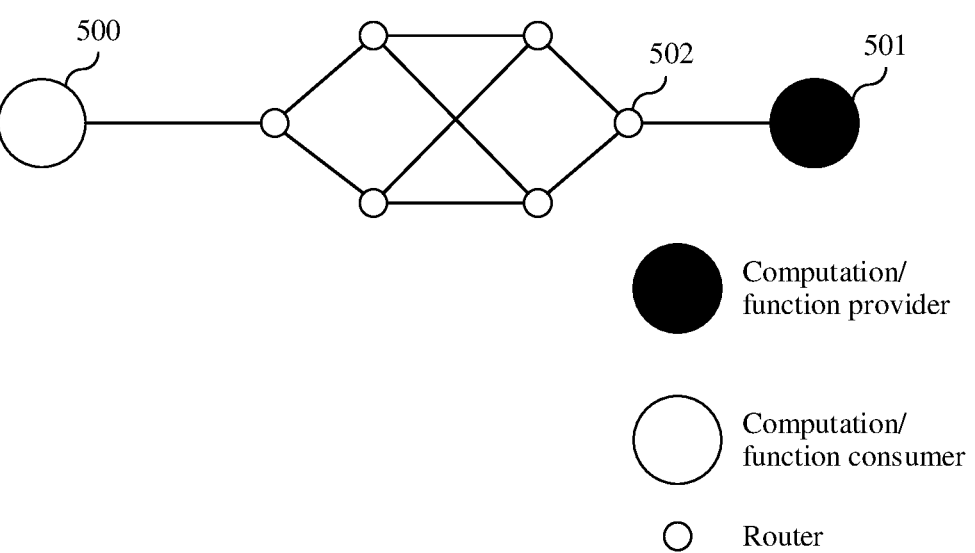
FIG. 5 is an example diagram of a network architecture according to the embodiment shown in FIG. 3.

FIG. 5 is a diagram of a network architecture according to an embodiment of this application. As shown in FIG. 5, an example in which a routing device is a router is used. The network may include the router, and a computation/function consumer 500 and a computation/function provider 501 are interconnected by using the network. The computation/function provider appears in a physical form of a computing container, runs a routing protocol as a leaf router in the network, and injects computing capability information of the computing container into the router or a switch in the network by using the routing protocol (IGP or BGP). For example, the computing capability information of the computing container may be distributed to each router in the network by using an ingress router 502 adjacent to the computing container. In other words, the computing container injects the computing capability information corresponding to the computing container into the ingress router 502 adjacent to the computing container. The ingress router performs topology discovery on the network, calculates a shortest path tree from the ingress router to each router in the network, and sends the computing capability information corresponding to the computing container to each router in the network based on the shortest path tree.

Figure 6:
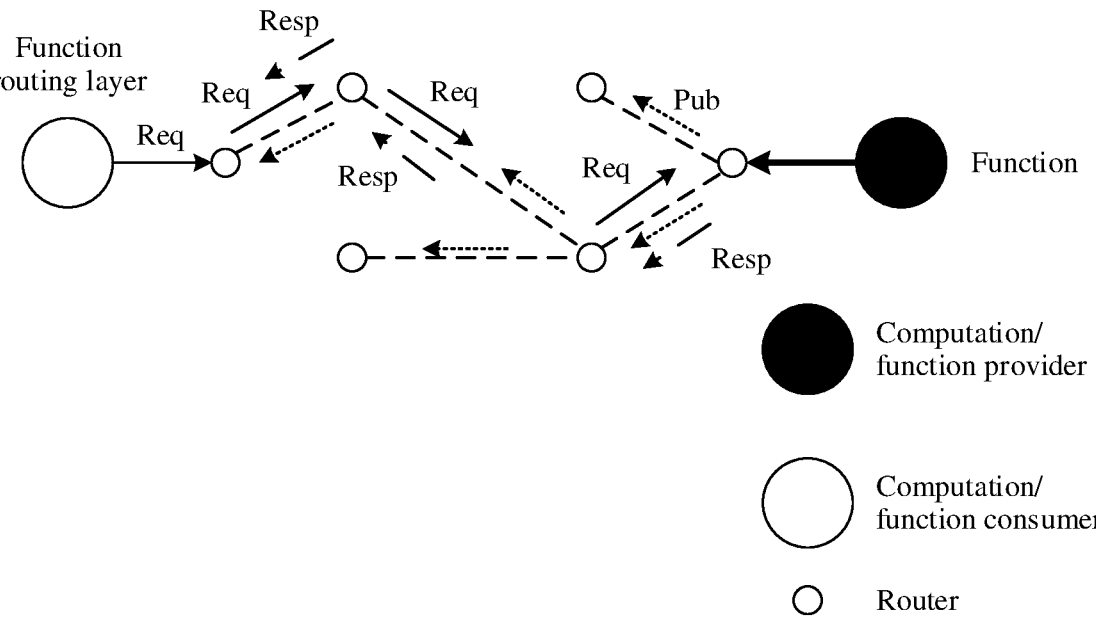
FIG. 6 is an example diagram of a network architecture of a function routing layer according to the embodiment shown in FIG. 3.

FIG. 6 is a diagram of a network architecture of a function routing layer according to an embodiment of this application. An example in which a routing device is a router is used. A hierarchical routing mechanism is introduced to the router. To be specific, a control plane of the router includes a basic routing layer module and a function routing layer module. The router may perform network topology discovery by using the basic routing layer, and calculate a shortest path tree from the router to another router. As shown in FIG. 6, a network data transmission status corresponding to a hotspot service is described from a perspective of the function routing layer. The router does not perform network-wide flooding processing on computing capability information that is of the hotspot service and that is from a computing container, but distributes the computing capability information to each router based on the shortest path tree obtained by the basic routing layer. In this way, traffic and a FIB table size are reduced.

First, the router publishes, to each router based on the shortest path tree, the computing capability information that is of the hotspot service and that corresponds to the computing container, and injects the information into a FIB forwarding table of the router.

When a computation/function consumer initiates a computation or service request, the router performs route calculation based on the computing capability information written into the FIB table, and forwards the computation or service request to a corresponding computation/function provider based on a calculated routing path.

The computation/function provider executes a corresponding computation, function, or service based on the computation or service request, and returns a function response to the computation/function consumer.

Figure 7:
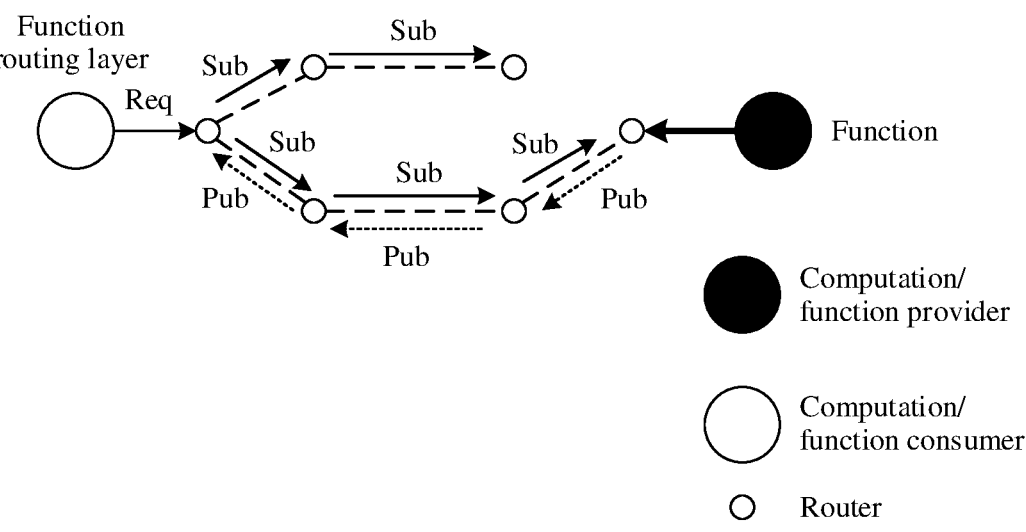
FIG. 7 is an example diagram of a network architecture of a function routing layer according to the embodiment shown in FIG. 3.

FIG. 7 is a diagram of a network architecture of a function routing layer according to an embodiment of this application. An example in which a routing device is a router is used. As shown in FIG. 7, a network data transmission status corresponding to a non-hot service is described from a perspective of the function routing layer. The router does not perform network-wide flooding processing on a computation or service request that is from a computation/function consumer and that is of the non-hot service; but converts the computation or service request into a subscription message, and distributes the subscription message to each router as a computing requirement path indication based on a shortest path tree obtained by a basic routing layer. When a computation/function provider publishes a corresponding service, application, or function, a transmission path of the service, application, or function may be determined based on the subscription message. This reduces traffic and a size of a FIB forwarding table.

The router converts the computation or service request into the subscription message, and sends the subscription message to each router based on the shortest path tree. Each router injects the subscription message into an FIB forwarding table of the router. When the computation/function provider publishes a corresponding calculation, function, or service program, the router forwards the calculation, function, or service program to the corresponding computation/function consumer based on the subscription message written into the FIB table.

Figure 8:
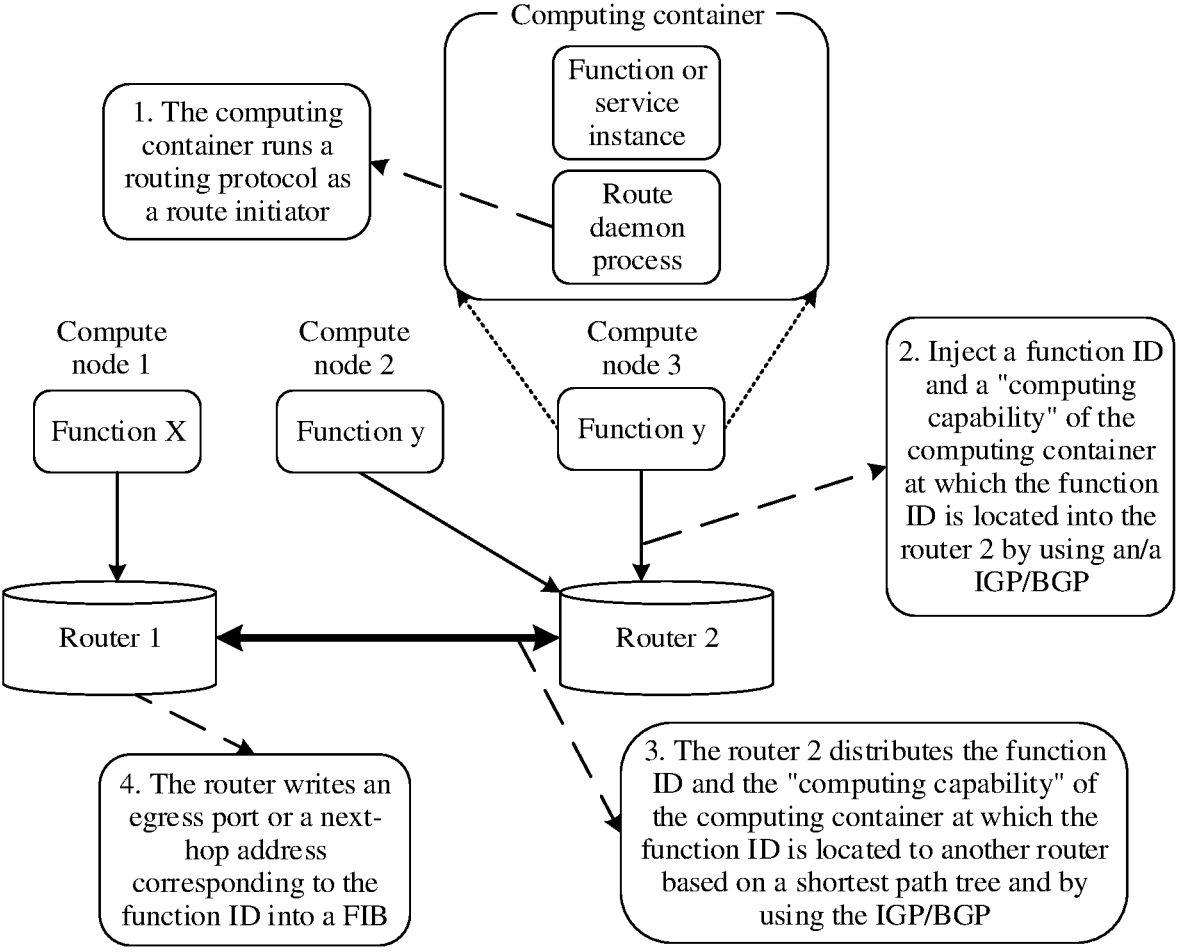
FIG. 8 is an example schematic flowchart of a routing method according to the embodiment shown in FIG. 3.

FIG. 8 is a schematic flowchart of a routing method according to an embodiment of this application. As shown in FIG. 8, the routing method includes the following steps.

1. A computing container in which each function or service instance is located runs a routing protocol (for example, an IGP or a BGP), and serves as an initiator of a route. In other words, the computing container joins a routing domain as a leaf router to initiate the routing protocol.

2. The computing container injects "a service or function identifier and a computing capability of the computing container at which the service or function identifier is located", that is, the computing capability information, into a routing network by using the routing protocol (IGP or BGP) packet. For example the computing container and an ingress router corresponding to the routing domain may be injected into a router to which the computing container belongs.

3. The ingress router adds an ingress router address to the computing capability information carried in the received BGP/IGP packet, and distributes the computing capability information to another router based on the shortest path tree and by using the BGP/IGP packet to flood the computing capability information to each router in the routing domain. Traffic is reduced compared with a flooding mode.

4. Each router in the routing domain obtains, based on the shortest path tree, information about the computing container having the computing capability in the routing domain, and the router writes the service or function ID and a corresponding egress port or next-hop address of the service or function ID into the FIB based on the computing capability information.

There is a large quantity of services or functions. To reduce traffic and a size of the FIB table, a hotspot attribute may be introduced to the service or function. Each hotspot attribute has a hotspot attribute value. Therefore, a hotspot threshold may be set on the router, and the router classifies service or functional areas into hot services and non-hot services based on the hotspot threshold. The computing container in which each function or service instance is located runs the routing protocol (for example, the IGP or the BGP), and serves as the initiator of the route. In other words, the computing container joins the routing domain as the leaf router to initiate the routing protocol. The computing container injects "the service or function identifier and the computing capability of the computing container at which the service or function identifier is located", that is, the computing capability information, into the routing network by using the routing protocol (IGP or BGP) packet. For example the computing container and the ingress router corresponding to the routing domain may be injected into the router to which the computing container belongs.

The ingress router determines, based on the hotspot threshold and the hotspot attribute value corresponding to the service or function identifier, whether a service or function corresponding to the service or function identifier is the hotspot service. If the service or function is identified as the hotspot service, the computing container and the corresponding ingress router in the routing domain, that is, a router adjacent to the computing container, distribute, based on the shortest path tree and by using a communications protocol such as the IGP/BGP, the service identifier, the function identifier, the hotspot attribute value, the computing capability information corresponding to the computing container, and the ingress router address that are carried in the received BGP/IGP packet to another router, to flood the information corresponding to the computing container to each router in the routing domain, that is, actively publish the information corresponding to the computing container. If the service or function is identified as the non-hot service, the service identifier, the function identifier, the hotspot attribute value, and the computing capability information of the computing container are discarded, that is, the information corresponding to the computing container is not actively published.

When the service or function changes from the hotspot service to the non-hotspot service, for example, when the hotspot threshold on the router changes, the router deletes an item corresponding to a corresponding service identifier or function identifier, for example, deletes information such as a hotspot attribute value corresponding to the service identifier or function identifier and the computing capability of the computing container.

FIG. 9 is a schematic flowchart of a routing method according to an embodiment of this application. In a conventional hand shaking (hand shaking) mechanism, interaction entities need to be online at the same time. One party needs to block itself until a peer end responds. Due to this strong coupling, provided that one of a computation consumer and a computation provider is temporarily offline, computation may fail. Therefore, the computation consumer needs to be decoupled in terms of time or synchronization. Therefore, hierarchical routing may be used to combine, on a communications model, a (Req/Resp) mechanism with a publish/subscription mechanism.

It is shown in FIG. 9. 1. Computation pull fails. If both the computation consumer and the computation provider are online, the computation consumer initiates a computation request and routes the request to the computation provider. The computation provider replies with a computation response to provide computation for the computation consumer. When the computation request cannot find a function ID in a FIB, that is, the computation for the computation provider fails to be pulled, it indicates that the computation provider is offline, and the corresponding function ID is not published in the FIB of the router.

2. Convert the computation pull into a computation requirement path indication. After the computation pull fails, the router converts the computation pull into a computation requirement path indication. To be specific, a routing node converts the computation or service request into a subscription message (that is, the computation requirement path indication) and publishes the message to each router based on a shortest path tree, and injects the information into the FIB of the router, so that the computation/function provider can determine returned path information based on the subscription message when publishing the corresponding computing information. For example, the routing node writes the service or function ID and corresponding ingress port information of the service or function ID into a service or function ID and a Pub-sub egress port in the FIB based on a service identifier or function identifier carried in the subscription message and an ingress port of a data plane that receives a packet and that corresponds to the subscription message and.

3. Perform pushing based on the computation requirement path indication. When the computation/function provider publishes a corresponding calculation, function, or service program (for example, the packet is a publish message), the router searches the FIB for the corresponding Pub-sub egress port based on the service or function ID carried in the packet. The Pub-sub egress port forwards the calculation, function, or service program to the corresponding computation/function consumer.

In conclusion, in the solution shown in this embodiment of this application, when receiving route calculation information indicating a computing capability of a computing container, the router obtains a shortest path tree of another router in a routing domain corresponding to the router, and sends, based on the shortest path tree corresponding to the router, the route calculation information to each other router in a network corresponding to the router, so that each router performs route calculation based on the route calculation information. According to the foregoing solution, the router performs route calculation based on the route calculation information distributed based on the shortest path tree. The computing capability of the computing container is considered during routing path selection, and traffic consumed for sending the route calculation information is reduced.

Figure 10:
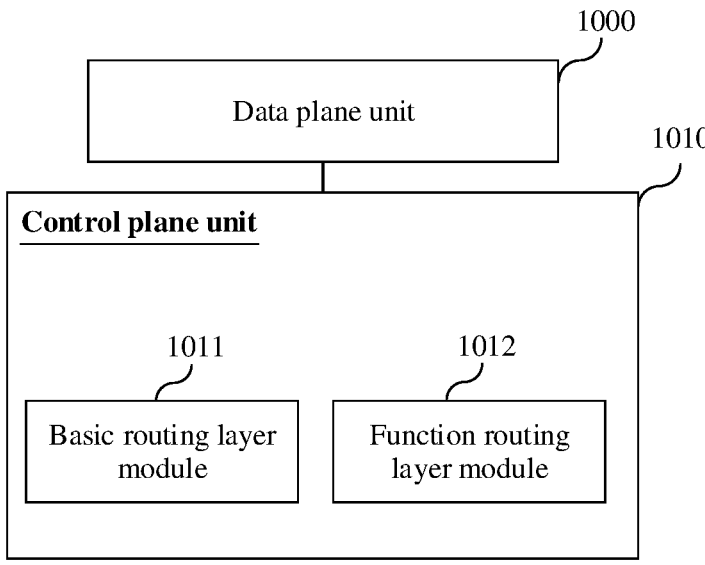
FIG. 10 is an example block diagram of a structure of an apparatus for sending route calculation information according to an example embodiment.

FIG. 10 is a structural block diagram of an apparatus for sending route calculation information according to an example embodiment. The apparatus may implement all or some of the steps of the method provided in the embodiment shown in FIG. 2 or FIG. 3. The apparatus includes a data plane unit 1000 and a control plane unit 1010, and the control plane unit includes a basic routing layer module 1011 and a function routing layer module 1012.

The function routing layer module 1012 is configured to receive route calculation information, where the route calculation information includes service capability information or computing capability information of a computing container, the computing capability information indicates a computing capability corresponding to the computing container, and the service capability information indicates a service processing capability of the computing container.

The basic routing layer module 1011 is configured to obtain a shortest path tree, where the shortest path tree includes a shortest path from the router to each other router in a network.

The function routing layer module 1012 is configured to send the route calculation information to each other router in the network based on the shortest path tree.

In a possible implementation, the route calculation information further includes a service or function identifier.

In a possible implementation, the route calculation information further includes a hotspot attribute value, and the hotspot attribute value indicates whether a service or an application corresponding to the route calculation information is a hotspot service.

The function routing layer module 1012 is further configured to:

when the hotspot attribute value is greater than a hotspot threshold, send the route calculation information to each other router in the network based on the shortest path tree.

In a possible implementation, the function routing layer module 1012 is further configured to:

generate or update a RIB routing table or a FIB forwarding table corresponding to the router based on the route calculation information.

In a possible implementation, the function routing layer unit is further configured to:

obtain network capability information of the network; and perform route calculation on the network based on the route calculation information and the network capability information, and generate or update the RIB or FIB table corresponding to the router.

In a possible implementation, the data plane unit 1000 is configured to:

receive a calculation request message, where the calculation request message is used to obtain a calculation program or a calculation result, and the calculation request message includes a service or function identifier;

query a RIB or FIB table of the router based on the service or function identifier;

when the service or function identifier exists in the RIB or FIB table of the router, obtain, based on the RIB or FIB table of the router, a first-type egress port or a first-type next-hop address corresponding to the service or function identifier; and send the calculation request message based on the first-type egress port or the first-type next-hop address corresponding to the service or function identifier.

In a possible implementation, the data plane unit 1000 is further configured to:

receive a response message, where the response message is used to deliver the calculation program or the calculation result;

determine, based on address information included in the response message, a first-type egress port or a first-type next-hop address corresponding to the response message; and send the response message based on the first-type egress port or the first-type next-hop address corresponding to the response message.

In a possible implementation, the function routing layer module 1012 is further configured to:

obtain a subscription message, where the subscription message is used to obtain a calculation program or a calculation result;

obtain a second-type egress port or a second-type next-hop address corresponding to the shortest path tree; and send the subscription message to each other router in the network based on the second-type egress port or the second-type next-hop address corresponding to the shortest path tree.

In a possible implementation, the data plane unit 1000 is further configured to:

receive a calculation request message, where the calculation request message is used to obtain the calculation program or the calculation result.

The function routing layer module 1012 is further configured to:

obtain the calculation request message as the subscription message.

In a possible implementation, the basic routing layer module 1011 is further configured to:

perform network topology discovery on the network to obtain the shortest path tree.

In a possible implementation, the function routing layer module 1012 is further configured to:

write the service or function identifier and input port information corresponding to the subscription message into a RIB or FIB forwarding table of the router.

In a possible implementation, the data plane unit 1000 is further configured to:

receive a publish message, where the publish message is used to send the computation program or the computation result, and the publish message includes a service or function identifier of a subscription message corresponding to the publish message;

query the RIB or FIB table of the router based on the service or function identifier, and obtain an input port corresponding to the subscription message as a second-type egress port or a second-type next-hop address corresponding to the subscription message; and send the publish message based on the second-type egress port or the second-type next-hop address corresponding to the subscription message.

In a possible implementation, the function routing layer module 1012 is further configured to:

receive a protocol packet of the computing container, where the protocol packet is delivered to the router after the computing container runs a routing protocol; and obtain the route calculation information of the computing container based on the protocol packet.

In conclusion, in the solution shown in this embodiment of this application, when receiving the route calculation information indicating the computing capability of the computing container, the router obtains a shortest path tree of another router in a routing domain corresponding to the router, and sends, based on the shortest path tree corresponding to the router, the route calculation information to each other router in the network corresponding to the router, so that each router performs route calculation based on the route calculation information. According to the foregoing solution, the router performs route calculation based on the route calculation information distributed based on the shortest path tree. The computing capability of the computing container is considered during routing path selection, and traffic consumed for sending the route calculation information is reduced.

It may be understood that, to implement the foregoing functions, an electronic device (for example, the routing device) includes a corresponding hardware structure and/or a corresponding software module (or unit) for performing each function. With reference to the units and algorithm steps described in embodiments disclosed in this application, embodiments of this application can be implemented in a form of hardware or hardware and computer software. Whether a function is performed by hardware or hardware driven by computer software depends on particular applications and implementation constraints of the technical solutions. A person skilled in the art may use different methods to implement the described functions for each particular application, but it should not be considered that the implementation falls beyond the scope of the technical solutions in embodiments of this application.

In embodiments of this application, the electronic device (for example, the routing device) may be divided into function units based on the method examples. For example, each function unit may be obtained through division based on each corresponding function, or two or more functions may be integrated into one processing unit. The integrated unit may be implemented in a form of hardware, or may be implemented in a form of a software function unit. It should be noted that, in this embodiment of this application, division into the units is an example, and is merely logical function division. In an actual implementation, another division manner may be used.

Figure 11:
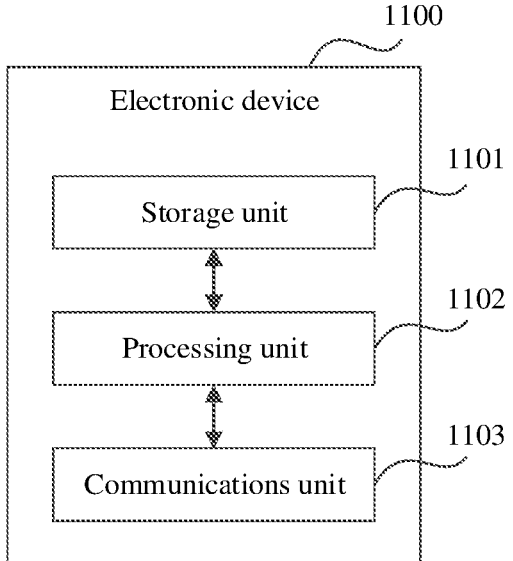
FIG. 11 is an example schematic block diagram of an electronic device according to an example embodiment of this application.

When an integrated unit is used, FIG. 11 is a schematic diagram of a possible structure of the electronic device in the foregoing embodiments. The electronic device 1100 includes a processing unit 1102 and a communications unit 1103. The processing unit 1102 is configured to control and manage an action of the electronic device 1100. For example, when the electronic device 1100 is the routing device, the processing unit 1102 is configured to support the electronic device 1100 to perform step 201 and step 202 in the embodiment shown in FIG. 2, step 301, step 302, and step 304 in FIG. 3, and/or another step of the technology described in this specification. The communications unit 1103 is configured to support the electronic device 1100 to perform step 203 in the embodiment shown in FIG. 2, step 303 in the embodiment shown in FIG. 8, and/or another step of the technology described in this specification. The electronic device 1100 may further include a storage unit 1101, configured to store program code and data of the electronic device 1100. For example, when the electronic device 1100 is the routing device, the storage unit 1101 stores the RIB or FIB table described above.

The processing unit 1102 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 1103 may be a communications interface, a transceiver, a transceiver circuit, or the like. The communications interface is a general term, and may include one or more interfaces, for example, an interface between the routing device and the computing container. The storage unit 1101 may be a memory.

Figure 12:
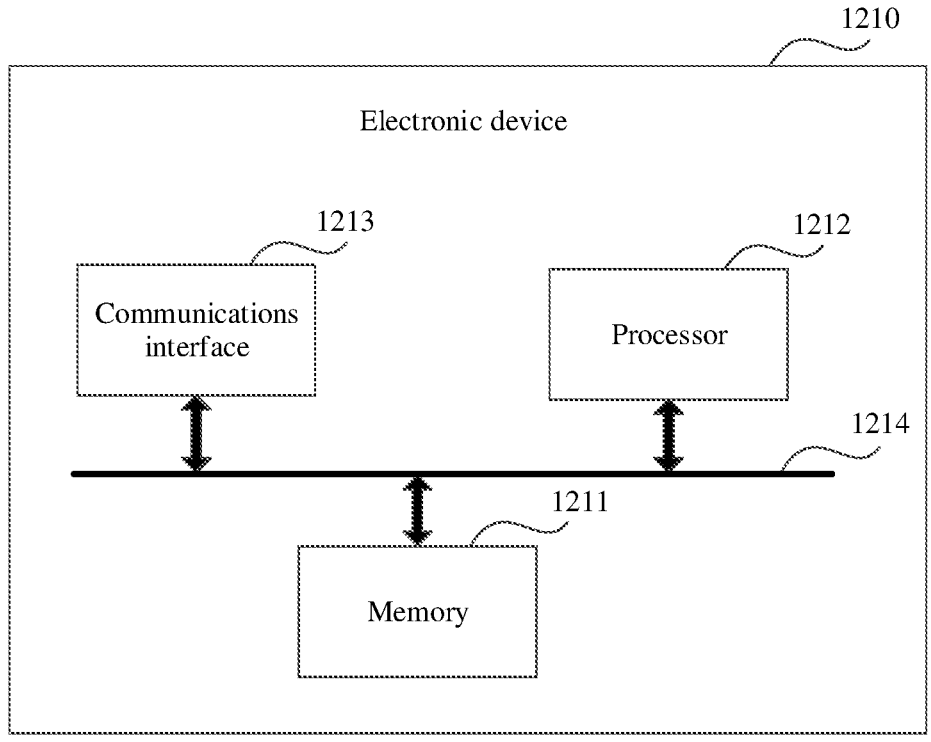
FIG. 12 is an example schematic diagram of a structure of an electronic device according to an example embodiment of this application.

When the processing unit 1102 is the processor, the communications unit 1103 is the communications interface, and the storage unit 1101 is the memory, the electronic device in this embodiment of this application may be an electronic device shown in FIG. 12.

Refer to FIG. 12. The electronic device 1210 includes a processor 1212, a communications interface 1213, and a memory 1211. Optionally, the electronic device 1210 may further include a bus 1214. The communications interface 1213, the processor 1212, and the memory 1211 may be connected to each other through the bus 1214. The bus 1214 may be a peripheral component interconnect (PCI for short) bus, an extended industry standard architecture (EISA for short) bus, or the like. The bus 1214 may be classified into an address bus, a data bus, a control bus, and the like. For ease of representation, only one thick line is used for representing the bus in FIG. 12, but this does not mean that there is only one bus or only one type of bus.

The electronic device shown in FIG. 11 or FIG. 12 may be a router.

Methods or algorithm steps described in combination with the content disclosed in this embodiment of this application may be implemented by hardware, or may be implemented by a processor by executing software instructions. The software instruction may include a corresponding software module (or unit). The software module (or unit) may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium that is well known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in an electronic device. Certainly, the processor and the storage medium may alternatively exist in the electronic device as discrete components.

This application further provides a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the foregoing method for sending route calculation information.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of embodiments of this application are further described in detail. It should be understood that the foregoing description is merely a specific implementation of embodiments of this application, but is not intended to limit the protection scope of embodiments of this application. Any modification, equivalent replacement, or improvement made based on the technical solutions of embodiments of this application shall fall within the protection scope of embodiments of this application.

What is claimed is:

1. A method, implemented by a router, for sending route calculation information, the method comprising:

receiving route calculation information from a previous-hop device, wherein the route calculation information includes service capability information of a computing container or computing capability information of the computing container, the computing capability information indicates a computing capability corresponding to the computing container, the service capability information indicates a service processing capability of the computing container, the route calculation information further includes a hotspot attribute value, and the hotspot attribute value indicates whether a service or an application corresponding to the route calculation information includes a hotspot service;

obtaining a shortest path tree including a shortest path from the router to each other router in a network; and in association with the hotspot attribute value being greater than a hotspot threshold, sending the route calculation information to each other router in the network corresponding to the shortest path tree.

2. The method according to claim 1, wherein the route calculation information further includes a service identifier or a function identifier.

3. The method according to claim 1, further comprising:

generating or updating a route information base (RIB) routing table or a forwarding information base (FIB) forwarding table corresponding to the router based on the route calculation information.

4. The method according to claim 3, wherein generating or updating the RIB routing table or the FIB forwarding table comprises:

obtaining network capability information of the network;

performing route calculation on the network based on the route calculation information and the network capability information; and generating or updating the RIB or FIB table corresponding to the router.

5. The method according to claim 1, further comprising:

receiving a calculation request message used to obtain a calculation program or a calculation result, wherein the calculation request message includes a service identifier or a function identifier;

querying a route information base (RIB) or forwarding information base (FIB) table of the router based on the service identifier or the function identifier;

when the service identifier or the function identifier exists in the RIB or FIB table of the router, obtaining, based on the RIB or FIB table of the router, a first-type egress port or a first-type next-hop address corresponding to the service identifier or the function identifier; and sending the calculation request message based on the first-type egress port or the first-type next-hop address corresponding to the service identifier or the function identifier.

6. The method according to claim 5, further comprising:

receiving a response message used to deliver the calculation program or the calculation result;

determining, based on address information included in the response message, a first-type egress port or a first-type next-hop address corresponding to the response message; and sending the response message based on the first-type egress port or the first-type next-hop address corresponding to the response message.

7. The method according to claim 1, further comprising:

obtaining a subscription message used to obtain a calculation program or a calculation result;

obtaining a second-type egress port or a second-type next-hop address corresponding to the shortest path tree; and sending the subscription message to each other router in the network based on the second-type egress port or the second-type next-hop address corresponding to the shortest path tree.

8. The method according to claim 7, wherein obtaining the subscription message comprises:

receiving a calculation request message used to obtain the calculation program or the calculation result; and obtaining the calculation request message as the subscription message.

9. The method according to claim 1, wherein the shortest path tree is obtained by performing network topology discovery on the network.

10. The method according to claim 7, wherein the subscription message comprises a service identifier or a function identifier, and the method further comprises:

writing the service identifier or the function identifier and input port information corresponding to the subscription message into a route information base (RIB) or forwarding information base (FIB) forwarding table of the router.

11. The method according to claim 10, further comprising:

receiving a publish message used to send the calculation program or the calculation result, wherein the publish message includes a service identifier or a function identifier of a subscription message corresponding to the publish message;

querying the RIB or FIB table of the router based on the service identifier or the function identifier, and obtaining an input port corresponding to the subscription message as a second-type egress port or a second-type next-hop address corresponding to the subscription message; and sending the publish message based on the second-type egress port or the second-type next-hop address corresponding to the subscription message.

12. The method according to claim 1, wherein receiving the route calculation information comprises:

receiving a protocol packet of the computing container, wherein the protocol packet is delivered to the router after the computing container executes a routing protocol; and obtaining the route calculation information of the computing container based on the protocol packet.

13. An apparatus, used in a router, for sending route calculation information, the apparatus comprising:

a data plane unit; and a control plane unit, wherein the control plane unit includes a basic routing layer module and a function routing layer module;

the function routing layer module is configured to receive route calculation information from a previous-hop device, wherein the route calculation information includes service capability information of a computing container or computing capability information of the computing container, the computing capability information indicates a computing capability corresponding to the computing container, the service capability information indicates a service processing capability of the computing container, the route calculation information further includes a hotspot attribute value, and the hotspot attribute value indicates whether a service or an application corresponding to the route calculation information includes a hotspot service;

the basic routing layer module is configured to obtain a shortest path tree including a shortest path from the router to each other router in a network; and the function routing layer module is further configured to:

in association with the hotspot attribute value being greater than a hotspot threshold, send the route calculation information to each other router in the network corresponding to the shortest path tree.

14. The method according to claim 1, further comprising:

in association with the hotspot attribute value not being greater than the hotspot threshold, discarding the route calculation information so as to avoid sending the route calculation information to the next-hop device in each routing path, wherein discarding the route calculation information comprises:

determining the service or function, corresponding to a service identifier or function identifier, is a non-hotspot service; and discarding the service identifier or function identifier, the hotspot attribute value, and the computing capability information corresponding to the route calculation information.

15. The apparatus according to claim 13, wherein the route calculation information further includes a service identifier or a function identifier.

16. The apparatus according to claim 13, wherein the function routing layer module is further configured to:

generate or update a route information base (RIB) routing table or a forwarding information base (FIB) forwarding table corresponding to the router based on the route calculation information.

17. The apparatus according to claim 16, wherein the function routing layer unit is further configured to:

obtain network capability information of the network;

perform route calculation on the network based on the route calculation information and the network capability information; and generate or update the RIB or FIB table corresponding to the router.

18. The apparatus according to claim 13, wherein the data plane unit is further configured to:

receive a calculation request message used to obtain a calculation program or a calculation result, wherein the calculation request message includes a service identifier or a function identifier;

query a route information base (RIB) or forwarding information base (FIB) table of the router based on the service identifier or the function identifier;

when the service identifier or the function identifier exists in the RIB or FIB table of the router, obtain, based on the RIB or FIB table of the router, a first-type egress port or a first-type next-hop address corresponding to the service identifier or the function identifier; and send the calculation request message based on the first-type egress port or the first-type next-hop address corresponding to the service identifier or the function identifier.

19. An apparatus associated with a router, the apparatus comprising:

a processor; and a memory configured to store computer readable instructions that, when executed by the processor, cause the apparatus to:

receive route calculation information from a previous-hop device, wherein the route calculation information includes service capability information of a computing container or computing capability information of the computing container, the route calculation information further includes a hotspot attribute value, and the hotspot attribute value indicates whether a service or an application corresponding to the route calculation information includes a hotspot service;

obtain a shortest path tree including a shortest path from the router to each other router in a network; and in association with the hotspot attribute value being greater than a hotspot threshold, send the route calculation information to each other router in the network corresponding to the shortest path tree.

20. The apparatus of claim 19, wherein the apparatus is further caused to:

obtain network capability information of the network;

perform route calculation on the network based on the route calculation information and the network capability information; and generate or update a route information base (RIB) routing table or a forwarding information base (FIB) forwarding table corresponding to the router based on the route calculation information.

* * * * *